United States Patent
Acker et al.

(10) Patent No.: US 7,281,735 B2
(45) Date of Patent: Oct. 16, 2007

(54) SEAT-INTEGRATED VEHICLE OCCUPANT RESTRAINT SYSTEM AND VEHICLE SEAT

(75) Inventors: Dominique Acker, Gschwend (DE); Andreas Loos, Rechberghausen (DE)

(73) Assignee: TRW Automotive GmbH, Alfdorf (DE)

( * ) Notice: Subject to any disclaimer, the term of this patent is extended or adjusted under 35 U.S.C. 154(b) by 80 days.

(21) Appl. No.: 10/842,984

(22) Filed: May 11, 2004

(65) Prior Publication Data

US 2004/0227335 A1 Nov. 18, 2004

(30) Foreign Application Priority Data

May 13, 2003 (DE) ................. 103 21 459

(51) Int. Cl.
*B60R 21/16* (2006.01)
(52) U.S. Cl. ................. 280/730.2; 280/728.2
(58) Field of Classification Search ........... 280/730.2, 280/728.3, 728.1, 728.2
See application file for complete search history.

(56) References Cited

U.S. PATENT DOCUMENTS

| | | | |
|---|---|---|---|
| 5,882,033 A | | 3/1999 | Lachat |
| 5,967,546 A | * | 10/1999 | Homier et al. ........... 280/730.2 |
| 6,045,151 A | * | 4/2000 | Wu ......................... 280/728.3 |
| 6,213,498 B1 | * | 4/2001 | Ghalambor et al. ..... 280/730.2 |
| 6,224,092 B1 | * | 5/2001 | Sakamoto et al. ....... 280/730.2 |
| 6,237,934 B1 | * | 5/2001 | Harrell et al. ........... 280/728.3 |
| 6,352,304 B1 | * | 3/2002 | Sorgenfrei ............. 297/216.13 |
| 6,513,828 B2 | * | 2/2003 | Aulbach ................. 280/728.3 |

FOREIGN PATENT DOCUMENTS

| | | |
|---|---|---|
| DE | 19826511 | 12/1998 |
| DE | 19860312 | 7/1999 |
| DE | 19915831 | 10/2000 |
| EP | 000826565 A2 * | 3/1998 |
| WO | 98/49032 | 11/1998 |

* cited by examiner

*Primary Examiner*—Eric Culbreth
(74) *Attorney, Agent, or Firm*—Tarolli, Sundheim Covell & Tummino LLP

(57) ABSTRACT

A seat-integrated vehicle occupant restraint system includes a gas bag module (17) having a gas bag (21), and a cover (31) for the module. The cover has at least one predefined outlet opening (9), provided for an emerging of the gas bag (21). A seat covering (31) has edge sections (33, 35) extending close to the outlet opening (9). A carrier part (27) is provided which is fixed in position in a rest of said seat. Fastened to said carrier part near the outlet opening (9) are the edge sections (33, 35) of the seat covering (31). The carrier part keeps the outlet opening (9) closed when the gas bag (17) is folded. The carrier part (27) and the seat covering (31) are decoupled relative to the gas bag module (17) and are movable relative to the gas bag module (17). The invention further relates to a vehicle seat equipped with such a restraint system.

20 Claims, 3 Drawing Sheets

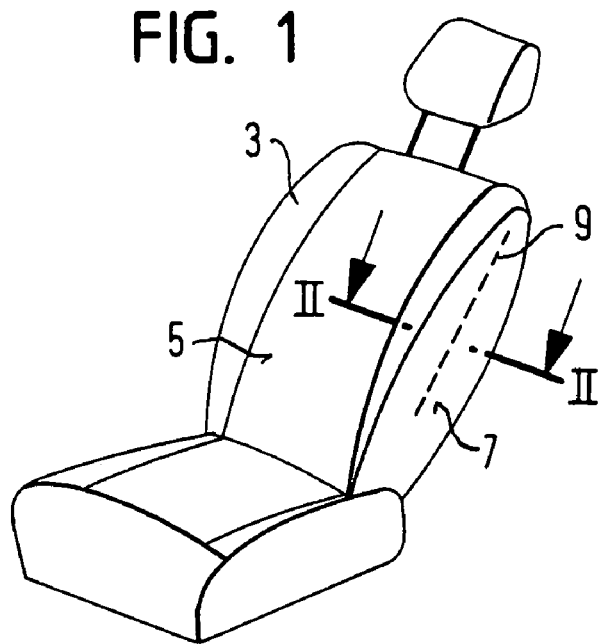
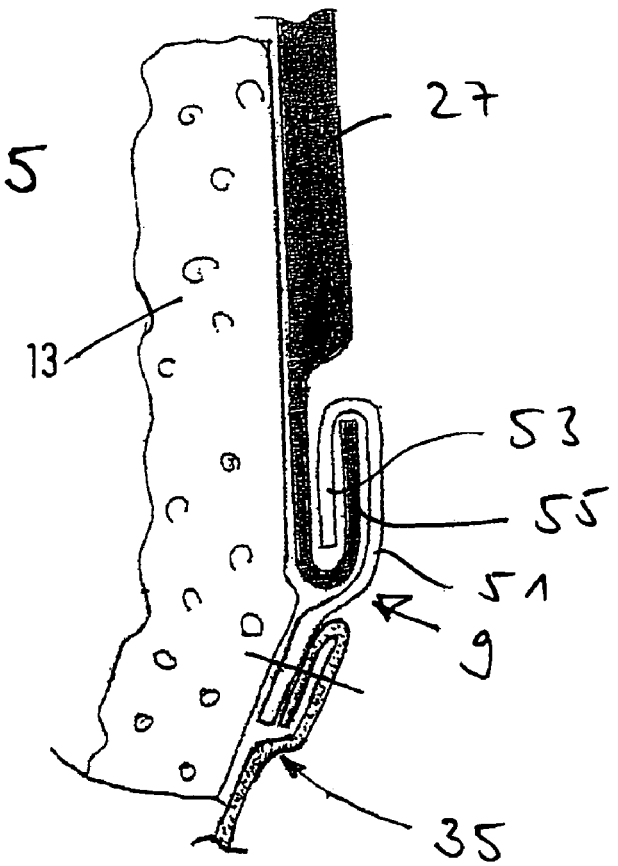

SEAT-INTEGRATED VEHICLE OCCUPANT RESTRAINT SYSTEM AND VEHICLE SEAT

TECHNICAL FIELD

The invention relates to a seat-integrated vehicle occupant restraint system and to a vehicle seat.

BACKGROUND OF THE INVENTION

Such seat-integrated vehicle occupant restraint systems are housed in the lateral region of the seat rest and in the case of a side impact move between the upper body and the door. The known gas bag modules are integrated into the side face, more precisely into a foamed part of the seat in this region. The seat covering (fabric or leather) has a predefined tear seam by, for example, the seat covering being provided with a slit in a specific region and the slit being sewn, or by two separate sections of the covering adjoining each other in the region of the tear seam and being connected with each other by the tear seam. The different materials of the seat covering which are offered have different extension behaviors. This must be taken into account in the design of the tear seam, because the tear seam is to offer a slight resistance to opening, which resistance is able to be predetermined within narrow limits.

From DE 199 15 831 A1 there is known a seat-integrated vehicle occupant restraint system in which the gas bag module is delimited by a housing made of plastics. The plastics back shell of the seat rest extends across the side wall and covers the gas bag module entirely towards outside. Further, the back shell also extends across an upholstery provided in the region of the side wall, as well as across its seat covering. On inflation of the gas bag the seat covering will not be destroyed, because the outlet opening is formed exclusively in the back shell the edge section of which forms an outwardly swiveling flap.

DE 198 60 312 A1 shows a seat-integrated vehicle occupant restraint system in which a gas bag module having a plastics outer housing is covered by the seat covering. The seat covering is provided with a slit, the opposite edge sections of the seat covering being connected with the outer housing of the gas bag module at various places.

U.S. Pat. No. 5,882,033 and EP 0,826,565 A2 describe seat-integrated restraint systems in which the seat covering comprises two parts in the region of the outlet opening. The outlet opening is closed by a plastics part which is fastened to the edges of the seat covering which are opposite to and spaced from each other. The plastics part works like a flap and forms a whole with the seat covering, i.e. it moves together with the latter.

The invention provides a seat-integrated vehicle occupant restraint system which is distinguished by a cover having a seat covering which independently of its material offers a resistance to tearing which is slight and can be predetermined within narrow limits. Moreover, the gas bag module is to be of simple construction and an opening behavior is to be achieved which is reproducible within narrow limits.

BRIEF SUMMARY OF THE INVENTION

According to the invention, a vehicle occupant restraint system integrated into a seat having a seat rest includes a gas bag module having a gas bag, and a cover covering the gas bag module externally. The cover has at least one predefined outlet opening, provided for an emerging of the gas bag from an interior of the seat and closed when the gas bag is folded. The restraint system further includes a seat covering which has edge sections that extend close to the outlet opening, and a carrier part which is fixed in position in the seat rest. Fastened to said carrier part are the edge sections of the seat covering which are provided near the outlet opening. The carrier part keeps the outlet opening closed when the gas bag is folded. The carrier part and the seat covering are decoupled relative to the gas bag module and are movable relative to the gas bag module.

In the vehicle occupant restraint system according to the invention, the edge sections of the seat covering, which delimit at least portions of the outlet opening, are not fastened to each other. This means that the edge sections are either not connected with each other at all in the region of the outlet opening or only minimally, owing to appearance, the carrier part ensuring that the outlet opening is closed. The tearing of the cover takes place on the carrier part by its destruction, so that the material of the seat covering does not play any part. The same carrier part can always be used for different seat covering materials, so that the opening force, once determined, remains the same despite different materials of the seat covering. In the invention, the gas bag module has no immediate, direct and firm connection with the seat covering and the carrier part. This is why the gas bag module, i.e. the outer housing thereof, can have a simpler and more cost-effective construction. What is more, relative motions between the gas bag module and the cover, which are exerted on the upholstery or the covering due to variations in temperature or movements of the occupant or other influences, will not exhibit any mutual influence on the cover and the gas bag module. It is because of this reason, too, that the outer housing of the module has to be configured so as to have a somewhat lesser strength, because it is not subject to the permanent stresses due to the above-mentioned relative motions. Finally, the carrier part is firmly fixed to the seat. As the carrier part usually has an inherent strength, it will provide for a defined position of the outlet opening, for instance independently of the fact if the occupant has just moved. This will ensure in all a reliable opening behavior. The edge section of the seat covering extends as far as close to the outlet opening and may delimit portions thereof towards outside. This may be done, for instance, in that the seat covering has two opposite edge sections adjoining each other, which are not immediately connected with each other, but instead to the carrier part extending underneath it. Furthermore it is possible, of course, that an edge section is fastened to the carrier part and extends as far as close to a line of weakening in the carrier part. It is in the region of the line of weakening where the cover will be torn open.

The carrier part is preferably fastened to the seat covering on the inner side.

According to the preferred embodiment, the edge sections lying opposite the outlet opening immediately adjoin each other, so that the carrier part is not visible from outside.

Preferably the edge sections even rest at each other.

In the region of the outlet opening, the carrier part has a predefined weakened zone, preferably a perforation or the like, so as to be able to be easily destroyed.

The invention also provides a further advantage, namely an improved shaping of the rest in a simple manner in the region of the module. In prior art, as in fact explained above, the module was integrated into the side face foam part of the seat, the foam of course having to be removed as far as possible towards the outlet opening, which impaired the seat structure at this place. According to the preferred embodiment, the invention makes provision that the carrier part has a greater rigidity than the seat covering. The carrier part therefore gives the rest a relatively rigid structure in the region of the outlet opening.

This is further improved in that the carrier part is preferably an inherently rigid component embracing the module to the outlet side on the seat. In this embodiment, the carrier part defines not only the region of the outlet opening, but the entire region of the seat rest in that region of the module where the outlet opening is provided. The carrier component can even determine the external geometry of the seat rest in the region of the overall module. Here, provision is preferably made that the carrier part is fastened to the rest frame and the module is arranged between the rest frame and the carrier part.

In order to decouple the gas bag module from the cover in terms of relative motions as far as possible, it is fastened to the rest frame at a fastening area spaced from the fastening area of the carrier part and the rest frame.

According to one embodiment, the carrier part extends from the back of the rest as far as into the side wall; it can also be visible in this area.

The seat covering is preferably sewn to the carrier part in the region of its edge section; a latching connection would also be possible.

The invention further also relates to a vehicle seat comprising a rest frame and a proposed vehicle occupant restraint system which is integrated into the rest.

BRIEF DESCRIPTION OF THE DRAWINGS

FIG. 1 shows a vehicle seat according to the invention, which is equipped with the vehicle occupant restraint system according to the invention.

DETAILED DESCRIPTION OF THE PREFERRED EMBODIMENTS

FIG. 1 illustrates a vehicle seat, which has a seat rest 3 including a front side 5 and a side wall 7 pointing towards the closest vehicle door.

A vehicle occupant restraint system is integrated into the seat rest in the region of the thorax, the gas bag of which system, in a side impact, emerges from the side wall 7 in the region of a slit-like outlet opening 9 illustrated with broken lines, and is intended to protect the upper body, possibly also the head of the occupant.

Figure 2:
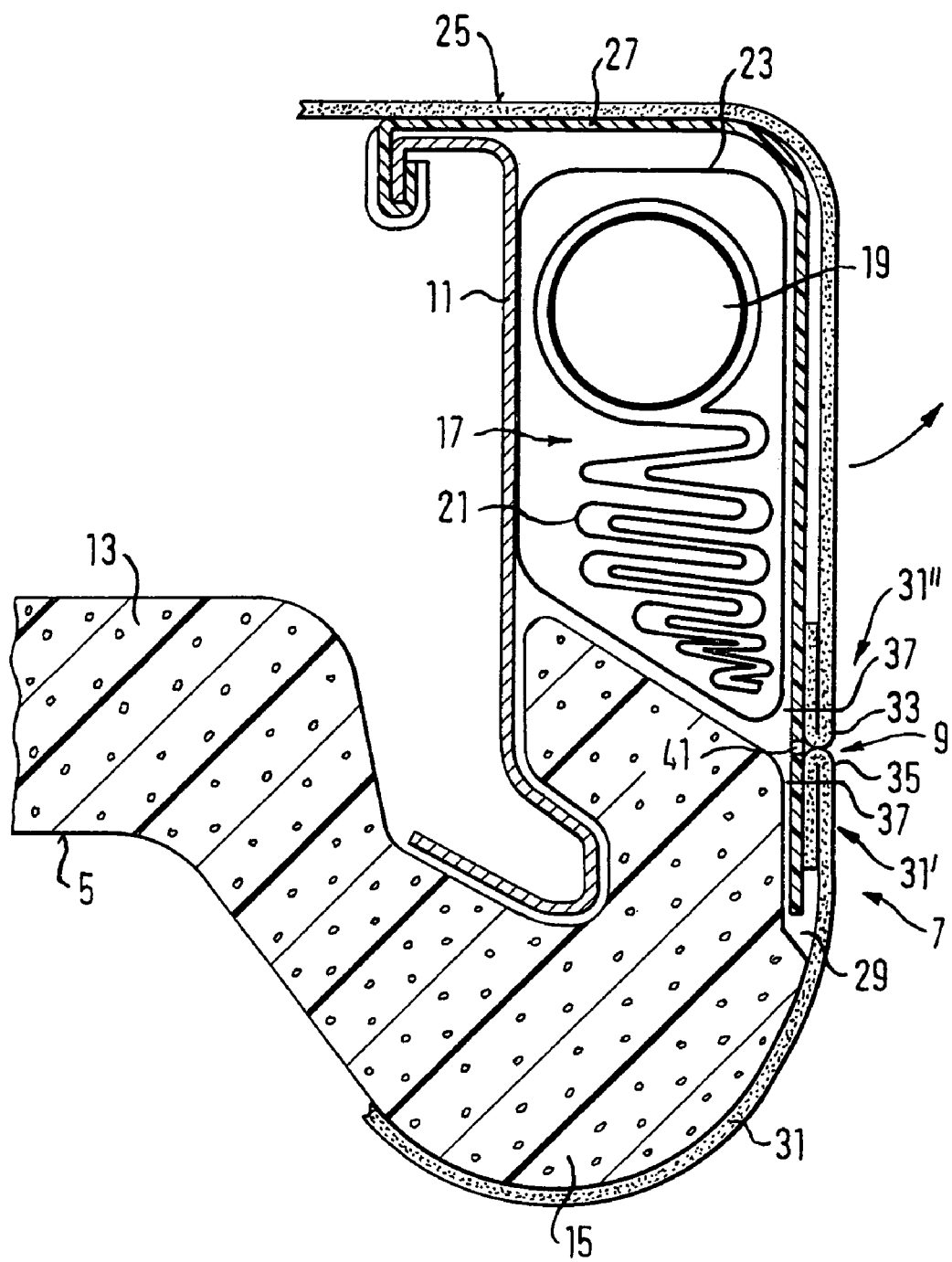
FIG. 2 shows a section through a side edge of the seat rest, which shows the seat-integrated vehicle occupant restraint system according to the invention, in accordance with line II—II in FIG. 1, and FIGS. 3 to 5 show sectional views through the side edge of the seat rest according to three another embodiments of the vehicle occupant restraint system according to the invention.

In FIG. 2 the integrated vehicle occupant restraint system can be seen better. The seat rest has a rest frame 11, which is only partially illustrated. To the front side 5, the rest 3 has a foamed upholstery 13 which continues into a side bead 15 which also defines a part of the side wall 7. A seat-integrated gas bag module 17, which has a gas generator 19 and a gas bag 21 surrounding the gas generator 19, defines the other part of the side wall 7. The gas bag module 17 is surrounded by a relatively soft, thin outer casing 23 and is immediately fastened to the rest frame 11, to be more precise, to a side region of the rest frame 11. This fastening area is spaced from the fastening area of the carrier part 27 provided at the rear side of the seat.

As can be seen from FIG. 2, the gas bag module 17 immediately adjoins the upholstery 13 and extends starting from this as far as to the rear side 25 of the rest. Laterally towards outside and at the rear side 25, the gas bag module 17 is covered by a cover formed by a carrier part 27 and a seat covering 31.

The inherently stable carrier part 27, made of plastics for example, is fastened in the region of the rear side 25 immediately to the rest frame 11 and extends laterally beyond the rest frame 11, to then run along the side wall 7 towards the front, in order to finally rest at the upholstery 13, which has a depression 29 in the region of the front edge of the carrier part 27. To the side of the module 17, no upholstery 13 is provided.

The carrier part 27 has an inherent rigidity which is greater than that of the outer casing 23 of the module 17. The carrier part 27 surrounds the gas bag module 17, which is embedded between carrier part 27, rest frame 11 and upholstery 13. A further function of the carrier part 27 consists in giving the seat rest a relatively rigid outer structure in the region of the gas bag module 17 and in establishing the external geometry of the seat rest in this region. As the carrier part 27 is not immediately connected with the gas bag module and has a specific elasticity, it can perform together with the seat covering 31 slight movements relative to the gas bag module 17 without displacing the outlet opening 9 to a significant degree.

For this reason, the carrier part 27 is also distinctly more rigid than the soft seat covering 31 which surrounds the entire seat externally.

In the region of the front end of the gas bag module 17, two sections 31', 31" of the seat covering 31 abut each other. The edge sections 33, 35 of the two sections 31', 31 " of the seat covering 31, defining the outlet opening 9, are formed in that in this region the seat covering is respectively turned inwards and the two sections 31', 31" of the seat covering 31 are sewn with the carrier part 27. Corresponding seams are given the reference number 37. The sections 31', 31" of the seat covering 31 in the region of the edge sections 33, 35 are not fastened immediately to each other, but rather only indirectly via the carrier part 27, although the edge sections 33, 35 immediately rest at each other.

The carrier part 27 is perforated in the region of the outlet opening 9, so has a predefined weakened zone 41.

After the activating of the gas generator 19, the gas bag 21 is inflated, the carrier part 27 tears open along the weakened zone 41 and pushes the flexible carrier part 27 outwards in the direction of the arrow, so that the outlet opening 9 is exposed. The carrier part 27 then also serves as a guiding aid for the gas bag 21, which unfolds in forward direction.

The seat covering 31 can be of fabric, synthetic leather or leather, with the option that even different materials of the seat covering 31 meet in the region of the outlet opening 9, especially since in this region readily also a change of material from fabric to washable synthetic leather or from leather to the more favorably priced synthetic leather is carried out.

Figure 3:
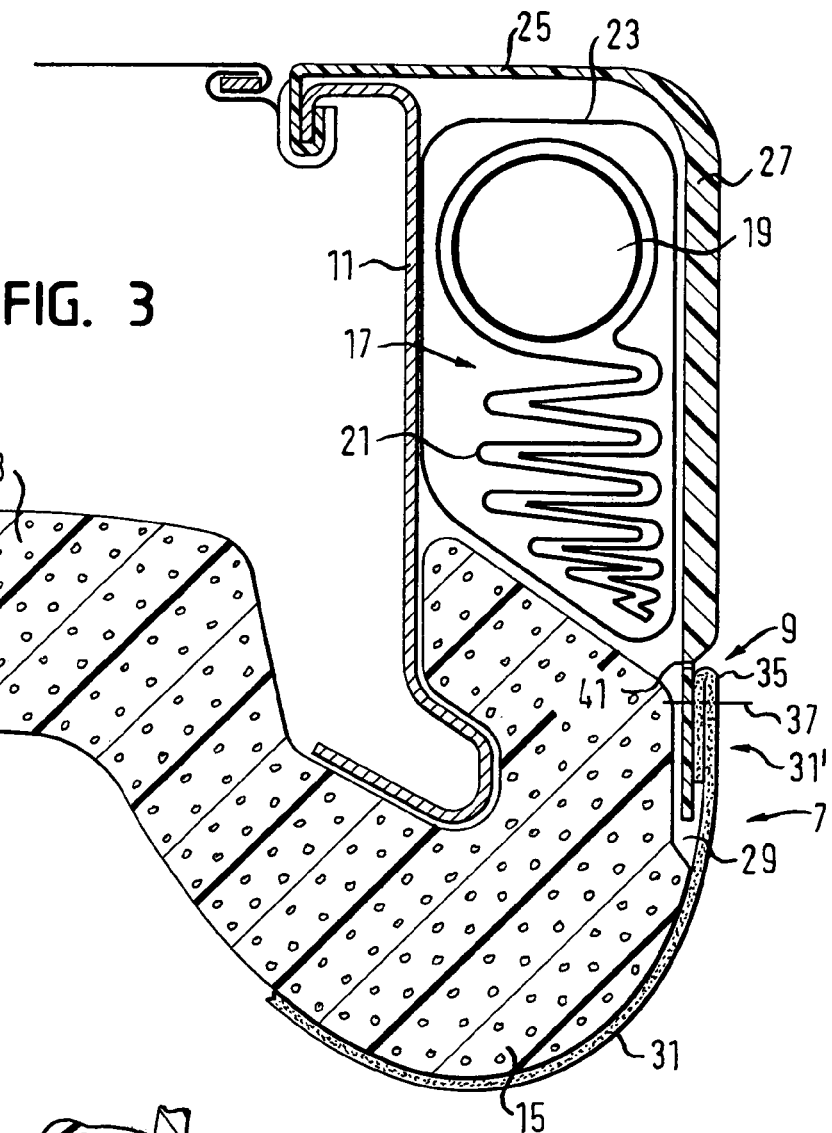

In the embodiment according to FIG. 3, the carrier part 27 is visible and not completely covered by the seat covering 31. The carrier part 27 extends starting from the region of the rear side 25 to the side wall 7 and forms sections thereof. The seat covering 31 extends from the front side as far as beyond the front edge of the carrier part 27 immediately to the weakened zone 41, and is sewn with the carrier part 27.

Figure 4:
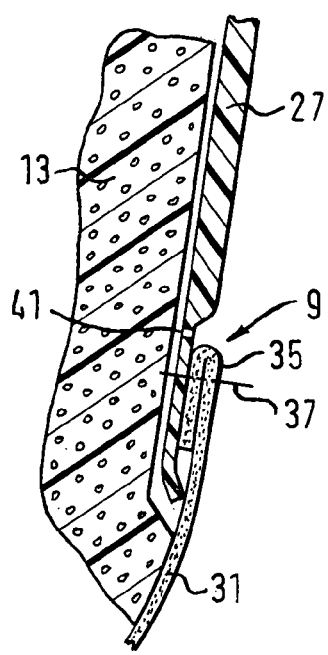

In the embodiment according to FIG. 4, an upholstery 13 is provided underneath the carrier part 27; this upholstery can also be provided so as to lie to the side of the gas bag module 17 and may be a kind of lateral support for the carrier part 27.

All embodiments shown so far have a small gap between the cover and the outer casing 23, so that the gas bag module 17 does not come into contact with the cover.

On the other hand, in the embodiment of FIG. 5 a plastic strip 51 is sewn to the folded-back edge section 35, which strip establishes an inwardly running edge 53, so that the strip 51 forms a U-shaped section. This section is engaged by a likewise U-shaped lower edge of the carrier part 27. As soon as the gas bag module 17 is activated, the strip 51 will be detached from the carrier part 27.

It is to be stressed that the vehicle occupant restraint system according to the invention can not only be integrated into a vehicle seat, but also into a rear seat bench, and that the outlet side on the rest does not necessarily have to be the side wall thereof, because it would also be possible to allow the gas bag to emerge on the front- or rear side of the rest and also between the occupants.

The invention claimed is:

1. A vehicle occupant restraint system integrated into a seat having a seat rest and a rest frame (11), said restraint system comprising
a gas bag module (17) having a gas bag (21),
a cover covering said gas bag module (17) externally and having at least one predefined outlet opening (9) provided for an emerging of said gas bag (21) from an interior of said seat and closed when said gas bag (21) is folded,
said cover including a seat covering (31) having edge sections (33, 35) that extend close to said outlet opening (9), and
said cover including a carrier part (27) fixed in position in said seat rest by attachment of said carrier part (27) to said rest frame (11), said edge sections (33, 35) of said seat covering (31) provided near said outlet opening (9) being fastened to said carrier part (27), which carrier part (27) keeps said outlet opening (9) closed when said gas bag (21) is folded,
said carrier part (27) and said seat covering (31) being decoupled relative to said gas bag module (17) and being movable relative to said gas bag module (17) when said gas bag is folded.

2. The seat-integrated vehicle occupant restraint system according to claim 1, wherein said edge sections (33, 35) of said seat covering (31) lie opposite with respect to said outlet opening (9) and are not connected immediately with each other.

3. The seat-integrated vehicle occupant restraint system according to claim 1, wherein said edge sections (33, 35) of said seat covering (31) lie opposite with respect to said outlet opening (9) and adjoin each other immediately.

4. The seat-integrated vehicle occupant restraint system according to claim 1, wherein said edge sections (33, 35) of said seat covering (31) lie opposite with respect to said outlet opening (9) and rest at each other.

5. The seat-integrated vehicle occupant restraint system according to claim 1, wherein said carrier part (27) has a predefined weakened zone (41) in a region of said outlet opening (9).

6. The seat-integrated vehicle occupant restraint system according to claim 5, wherein said weakened zone (41) is a perforation.

7. The seat-integrated vehicle occupant restraint system according to claim 1, wherein said carrier part (27) has a greater rigidity than said seat covering (31).

8. The seat-integrated vehicle occupant restraint system according to claim 1, wherein said carrier part (27) is an inherently rigid component embracing said gas bag module (17) to an outlet side (7) of said gas bag (21) on said seat.

9. The seat-integrated vehicle occupant restraint system according to claim 1, wherein said carrier part (27) determines an external geometry of said seat rest (3) in a region of said gas bag module (17).

10. The seat-integrated vehicle occupant restraint system according to claim 1, wherein said gas bag module (17) lies between said rest frame (11) and said carrier part (27).

11. The seat-integrated vehicle occupant restraint system according to claim 1, wherein said gas bag module (17) has an outer casing (23) which has a lower rigidity than said carrier part (27).

12. The seat-integrated vehicle occupant restraint system according to claim 1, wherein said gas bag module (17) is fastened to said rest frame (11) at a fastening area spaced from a fastening area of said carrier part (27) to said rest frame (11).

13. The seat-integrated vehicle occupant restraint system according to claim 1, wherein said carrier part (27) delimits portions of said outlet opening (9).

14. The seat-integrated vehicle occupant restraint system according to claim 1, wherein said carrier part (27) extends from a back of said rest as far as into a side wall of said seat rest.

15. The seat-integrated vehicle occupant restraint system according to claim 1, wherein said seat covering (31) is sewn to said carrier part.

16. A vehicle seat comprising a seat rest with a rest frame (11) and a vehicle occupant restraint system which is integrated into said seat rest of said vehicle seat and comprises a gas bag module (17) having a gas bag (21), a cover covering said gas bag module (17) externally, which cover has at least one predefined outlet opening (9) provided for an emerging of said gas bag (21) from an interior of said seat and closed when said gas bag (21) is folded, said cover including a seat covering (31) having edge sections (33, 35) extending close to said outlet opening (9), and said cover including a carrier part (27) fixed in position in said seat rest by attachment of said carrier part (27) to said rest frame (11), said edge sections (33, 35) of said seat covering (31) provided near said outlet opening (9) being fastened to said carrier part (27), which carrier part (27) keeps said outlet opening (9) closed when said gas bag (21) is folded, said carrier part (27) and said seat covering (31) being decoupled relative to said gas bag module (17) and being movable relative to said gas bag module (17) when said gas bag is folded.

17. A vehicle occupant restraint system integrated into a seat having a seat rest and a rest frame (11), said restraint system comprising
a gas bag module (17) having a gas bag (21),
a cover covering said gas bag module (17) externally and having at least one predefined outlet opening (9) provided for an emerging of said gas baa (21) from an interior of said seat and closed when said gas bag (21) is folded,
said cover comprising a seat covering (31) having edge sections (33, 35) that extend close to said outlet opening (9), and
a carrier part (27) fixed in position in said seat rest by attachment of said carrier part (27) to said rest frame (11), said edge sections (33, 35) of said seat covering (31) provided near said outlet opening (9) being fastened to said carrier part (27), which carrier part (27) keeps said outlet opening (9) closed when said gas bag (21) is folded, said carrier part (27) and said seat covering (31) being decoupled relative to said gas bag module (17) and being movable relative to said gas bag module (17), said carrier part (27) including first and second outer portions, said first outer portion comprising a hook configuration for retaining the carrier part (27) to the rest frame (11) and said second outer portion freely extending beyond said outlet opening (9).

18. A vehicle seat comprising a seat rest with a rest frame (11) and a vehicle occupant restraint system which is integrated into said seat rest of said vehicle seat and comprises a gas bag module (17) having a gas bag (21), a cover covering said gas bag module (17) externally, which cover has at least one predefined outlet opening (9) provided for an emerging of said gas bag (21) from an interior of said seat and closed when said gas bag (21) is folded, a seat covering (31) having edge sections (33, 35) extending close to said outlet opening (9), and a carrier part (27) fixed in position in said seat rest by attachment of said carrier part (27) to said rest frame (11), said edge sections (33, 35) of said seat covering (31) provided near said outlet opening (9) being fastened to said carrier part (27), which carrier part (27) keeps said outlet opening (9) closed when said gas bag (21) is folded, said carrier part (27) and said seat covering (31) being decoupled relative to said gas bag module (17) and being movable relative to said gas bag module (17), said carrier part (27) including first and second outer portions, said first outer portion comprising a hook configuration for retaining the carrier part (27) to the rest frame (11) and said second portion freely extending beyond said outlet opening (9).

19. A vehicle seat comprising:
a gas bag module (17) having a gas bag (21);
a seat covering (31) comprising edge sections (33, 35) having first and second ends, said ends being overlapped by said covering (31) to form a predefined outlet opening (9) therebetween;
a carrier part (27) having first and second outer portions, said second outer portion being attached to said edges and extending beyond said outlet opening (9) for keeping the outlet opening closed;
the first outer portion of said carrier part (27) being fixedly attached to a rest frame (11) at a first location;
a weakened zone (41) positioned on said carrier part (27) in close proximity to said outlet opening (9); and
said gas bag module (17) attached to said rest frame (11) at a second location spaced from the first location.

20. The vehicle seat according to claim 19, wherein said first outer portion of said carrier part (27) includes a hook configuration for retaining the carrier part to said rest frame (11).

* * * * *